United States Patent
Cho et al.

(10) Patent No.: US 7,366,411 B2
(45) Date of Patent: Apr. 29, 2008

(54) SYSTEM AND METHOD FOR OPERATING OPTICAL TRANSPONDER

(75) Inventors: Yun-Hee Cho, Daejeon (KR); Seung-Il Myong, Daejeon (KR); Jyung-Chan Lee, Daejeon (KR); Yool Kwon, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 618 days.

(21) Appl. No.: 10/693,058

(22) Filed: Oct. 23, 2003

(65) Prior Publication Data

US 2004/0126111 A1 Jul. 1, 2004

(30) Foreign Application Priority Data

Dec. 27, 2002 (KR) .................. 10-2002-0084982

(51) Int. Cl.
*H04B 10/08* (2006.01)
(52) U.S. Cl. .......................... 398/25; 398/33
(58) Field of Classification Search ............. 398/25
See application file for complete search history.

(56) References Cited

U.S. PATENT DOCUMENTS

| | | | | |
|---|---|---|---|---|
| 4,268,722 A * | 5/1981 | Little et al. | ............. | 370/338 |
| 4,975,836 A * | 12/1990 | Hirosawa et al. | ............. | 718/100 |
| 6,678,854 B1 * | 1/2004 | Irvin | ............. | 714/752 |
| 6,683,855 B1 * | 1/2004 | Bordogna et al. | ............. | 370/244 |
| 6,725,032 B1 * | 4/2004 | Sheridan et al. | ............. | 455/419 |
| 6,870,859 B1 * | 3/2005 | Kozaki et al. | ............. | 370/535 |
| 6,993,700 B1 * | 1/2006 | Player et al. | ............. | 714/758 |
| 7,002,968 B1 * | 2/2006 | Tomizawa et al. | ............. | 370/395.52 |
| 7,028,231 B1 * | 4/2006 | Tezuka | ............. | 714/704 |
| 2004/0156325 A1 * | 8/2004 | Perkins et al. | ............. | 370/299 |

FOREIGN PATENT DOCUMENTS

| | | |
|---|---|---|
| KR | 1001501480000 | 6/1998 |
| KR | 1020000010138 | 2/2000 |
| KR | 1020000037855 | 7/2000 |
| KR | 10-2001-0064147 A | 7/2001 |
| KR | 10-2002-0053546 A | 7/2002 |

OTHER PUBLICATIONS

"OCh-level OAM digital wrapper An Overhead Processing Model of digital wrapper for OCh-level OAM", Phototonics Conference 2002, 2 pages.
"An Overhead Processing Model for OCh-level OAM", Y. Cho, et al., pp. 289-291.

* cited by examiner

*Primary Examiner*—Kenneth Vanderpuye
*Assistant Examiner*—Thi Q. Le
(74) *Attorney, Agent, or Firm*—Blakely, Sokoloff, Taylor & Zafman

(57) ABSTRACT

The method for operating an optical transponder, which performs maintenance of a signal in the optical transponder having a digital wrapper in an optical transmission system including multiple layers, includes (a) calling a processor for processing an interrupt when the interrupt is generated from the digital wrapper according to monitoring of a received signal; (b) the called processor detecting what defect is generated in the received signal and detecting whether or not the received signal requires maintenance; (c) performing defect processing in the case that a defect is detected at (b) or is cancelled; and (d) controlling the digital wrapper according to the defect and maintenance processing result.

8 Claims, 13 Drawing Sheets

FIG.7
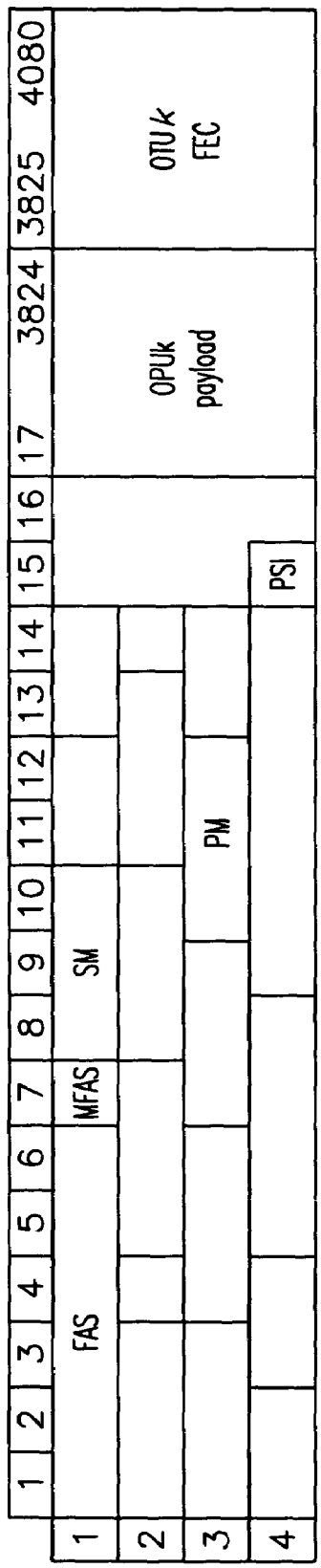
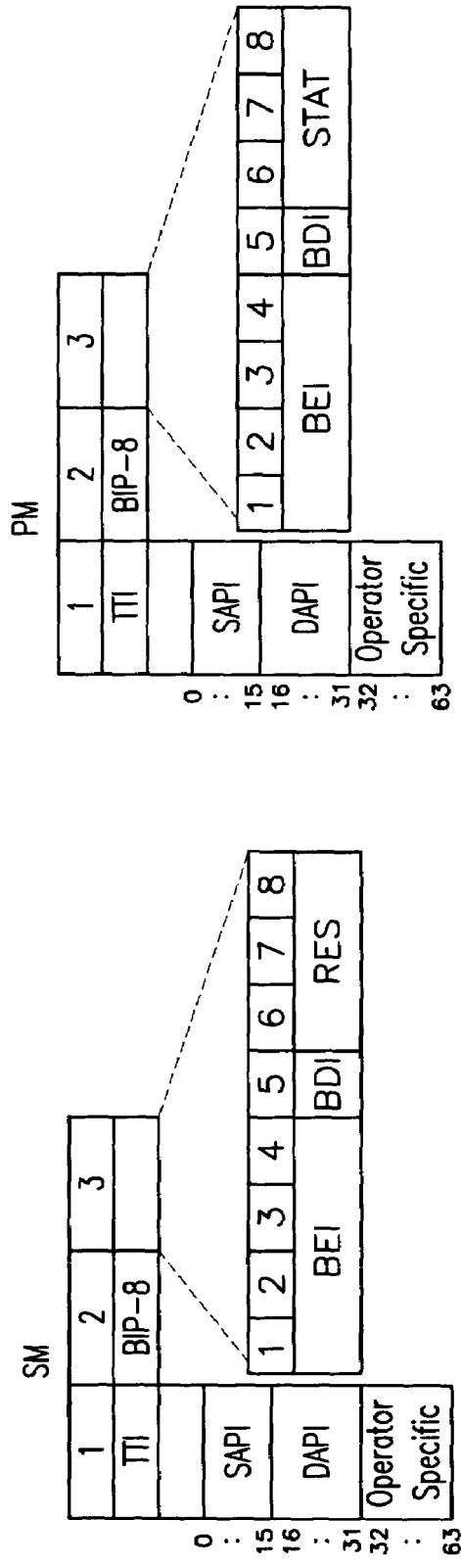

SYSTEM AND METHOD FOR OPERATING OPTICAL TRANSPONDER

CROSS REFERENCE TO RELATED APPLICATION

This application claims priority to and the benefit of Korea Patent Application No. 2002-84982 filed on Dec. 27, 2002 in the Korean Intellectual Property Office, the content of which is incorporated herein by reference.

BACKGROUND OF THE INVENTION (a) Field of the Invention

The present invention relates to a system and method for operating an optical transponder. More specifically, the present invention relates to a system and method for maintaining and operating signals in an optical transponder having a digital wrapper.

(b) Description of the Related Art

FIG. 1 is a block diagram of an optical transport system to which an optical transponder is applied. As shown in FIG. 1, the optical transport system generally includes a first optical channel unit 120 for receiving a signal transmitted from an optical transmitter 110 to transmit it, an optical multiplexing unit 130 for accepting signals sent from the first optical channel unit to multiplex them, an optical transmission unit 140 for transmitting the optical signal multiplexed by the optical multiplexing unit, an optical demultiplexing unit 150 for receiving the optical signal sent from the optical transmission unit to demultiplex it, and a second optical channel unit 160 for delivering the signals demultiplexed by the demultiplexing unit to an optical receiver 170 of an external system.

In the optical transport system having the above-described configuration, the optical transponder is used for the first and second optical channel units 120 and 160. The optical transponder delivers a client signal transmitted from an external transport network to an optical transport network, transmits a signal sent from the optical transport network to the external transport network, or restores a signal transmitted from the optical transport network and delivers it to the optical transport network again.

A signal generated by a digital wrapper conformable to ITU-T (International Telecommunication Union-T) Recommendation G.709 is obtained by mapping a client signal to a payload, and it has an overhead including information about maintenance of optical signals, performance information, monitoring information, and an error correction code. In general, the digital wrapper has been used for improving optical signal transmission performance using the error correction code. In addition, optical channels can be efficiently monitored and administered irrespective of a transmitter client signal by using the overhead of the digital wrapper. ITU-T Rec G.709 defines the frame structure of the digital wrapper and interface between networks. Therefore, a method of operating the overhead of the digital wrapper is required in order to effectively monitor and administer the optical channels.

SUMMARY OF THE INVENTION

It is an object of the present invention to provide a system and method for effectively monitoring and administering optical channels using the overhead of a digital wrapper, irrespective of a transmitted client signal, in an optical transponder having the digital wrapper.

In one aspect of the present invention, the method for operating an optical transponder, which performs maintenance of a signal in the optical transponder having a digital wrapper in an optical transmission system including multiple layers, comprises (a) calling a processor for processing an interrupt when the interrupt is generated from the digital wrapper according to monitoring of a received signal; (b) the called processor detecting what defect is generated in the received signal and detecting whether or not the received signal requires maintenance; (c) performing defect processing in the case that a defect is detected at (b) or is cancelled; and (d) controlling the digital wrapper according to the defect and maintenance processing result.

The step (a) sets a defect mask for each layer and processes an interrupt of each layer only when the defect mask therefor is true.

In the case that a defect of an OCH channel is detected/cancelled, the step (b) processes the defect mask of another layer to be false so as to ignore processing of a generated interrupt.

The operation method further comprises a step of displaying presence/absence of a defect and the quantity of BIP-errors; a step of finding the cause of the defect to report it; and a step of monitoring a performance value of the received signal to report it.

In another aspect of the present invention, the system for operating an optical transponder, which executes maintenance of a signal in the optical transponder having a digital wrapper in an optical transmission system including a plurality of layers, comprises a digital wrapper interrupt processor for processing an interrupt signal generated from the digital wrapper according to monitoring of a received signal; a defect and maintenance signal detector for determining whether or not the received signal has a defect, and determining whether or not the received signal requires maintenance under the control of the digital wrapper interrupt processor; a defect and maintenance signal processor for, when a defect is detected by the defect and maintenance signal detector or cancelled, processing the defect; and a digital wrapper controller for controlling the digital wrapper according to the processing result of the defect and maintenance signal processor.

Here, only when the digital wrapper interrupt processor detects an interrupt with respect to the received signal from the digital wrapper and determines that the received signal has a defect, the digital wrapper interrupt processor calls the defect and maintenance signal detector to allow it to detect the defect.

Furthermore, the digital wrapper interrupt processor sets a defect mask for each layer and processes an interrupt of each layer only when the defect mask therefor is true.

Meanwhile, a signal that is received and transmitted by the optical transponder has a structure that maps a client signal to a payload and includes an error correction de and an overhead. Here, the system may further comprise a transmitter information providing part for providing information required to be delivered to a receiving side through the overhead of the transmitted signal; and a receiver information providing part for providing an expected value of information required to be received through the overhead.

The system for operating an optical transponder further comprises a remote information display for displaying presence/absence of a defect and the quantity of BIP-errors according to the result of the defect and maintenance signal processor; a defect correlation reporting part for finding the cause of the defect to report it; and a performance monitoring part for monitoring a performance value of the received signal to report it.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 7 illustrates the overhead of the frame structure shown in FIG. 6 in detail;

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

The optical transponder according to a preferred embodiment of the present invention has a digital wrapper supporting the frame structure of ITU-T G.709, uses overheads of OUT (optical transport unit), ODU (optical data unit), and OPU (optical payload unit) layers, and monitors the performance, alarm, and maintenance signal of each of the layers to enable the operation, administration, and maintenance (referred to as "OAM" hereinafter) of an optical channel.

Figure 1:
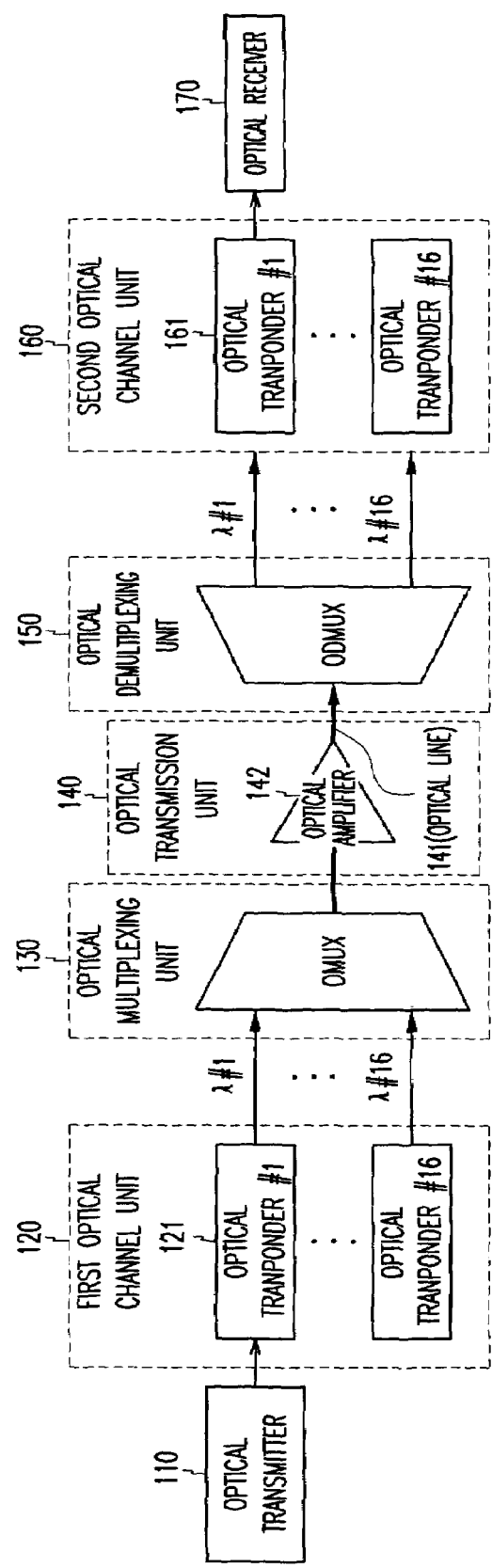
FIG. 1 is a block diagram of an optical transport system to which an optical transponder is applied.
Figure 2:
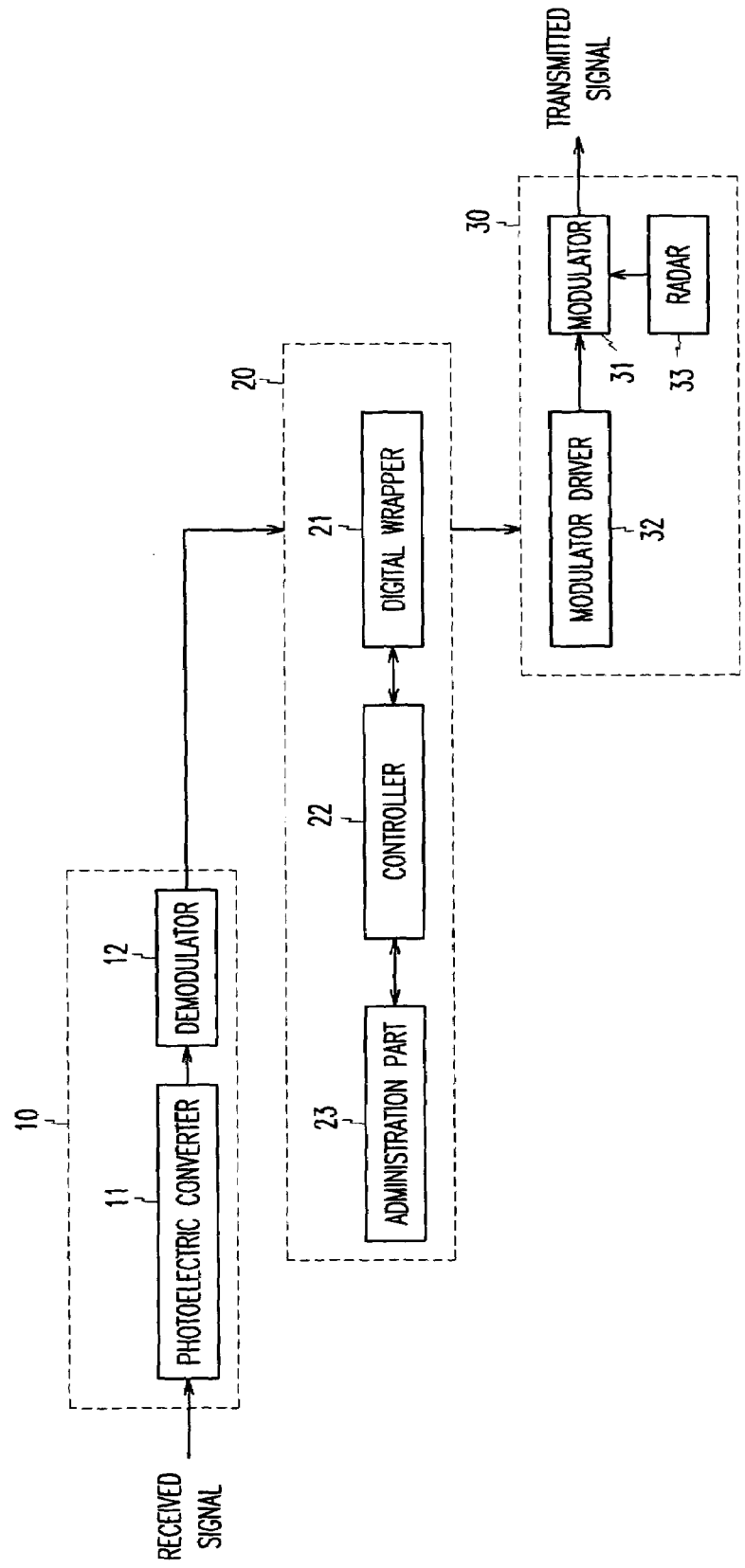
FIG. 2 is a block diagram of an optical transponder according to an embodiment of the present invention.

FIG. 2 is a block diagram of the optical transponder according to an embodiment of the present invention. As shown in FIG. 2, the optical transponder includes a photo-electric converter 11 for converting an input optical signal into an electric signal; a receiver 10 having a demodulator 12 for demodulating the electric signal to reproduce original data; an operator 20 for performing administration functions including error correction of the received signal; and a transmitter 30 consisting of a modulator 31 for converting the error-corrected signal provided by the operator 20 into an optical signal, a modulator driver 32, and a radar 33 for supplying light to the modulator. Here, the receiver 10 and transmitter 30 of the optical transponder are well-known, so explanations for them are omitted.

Figure 3:
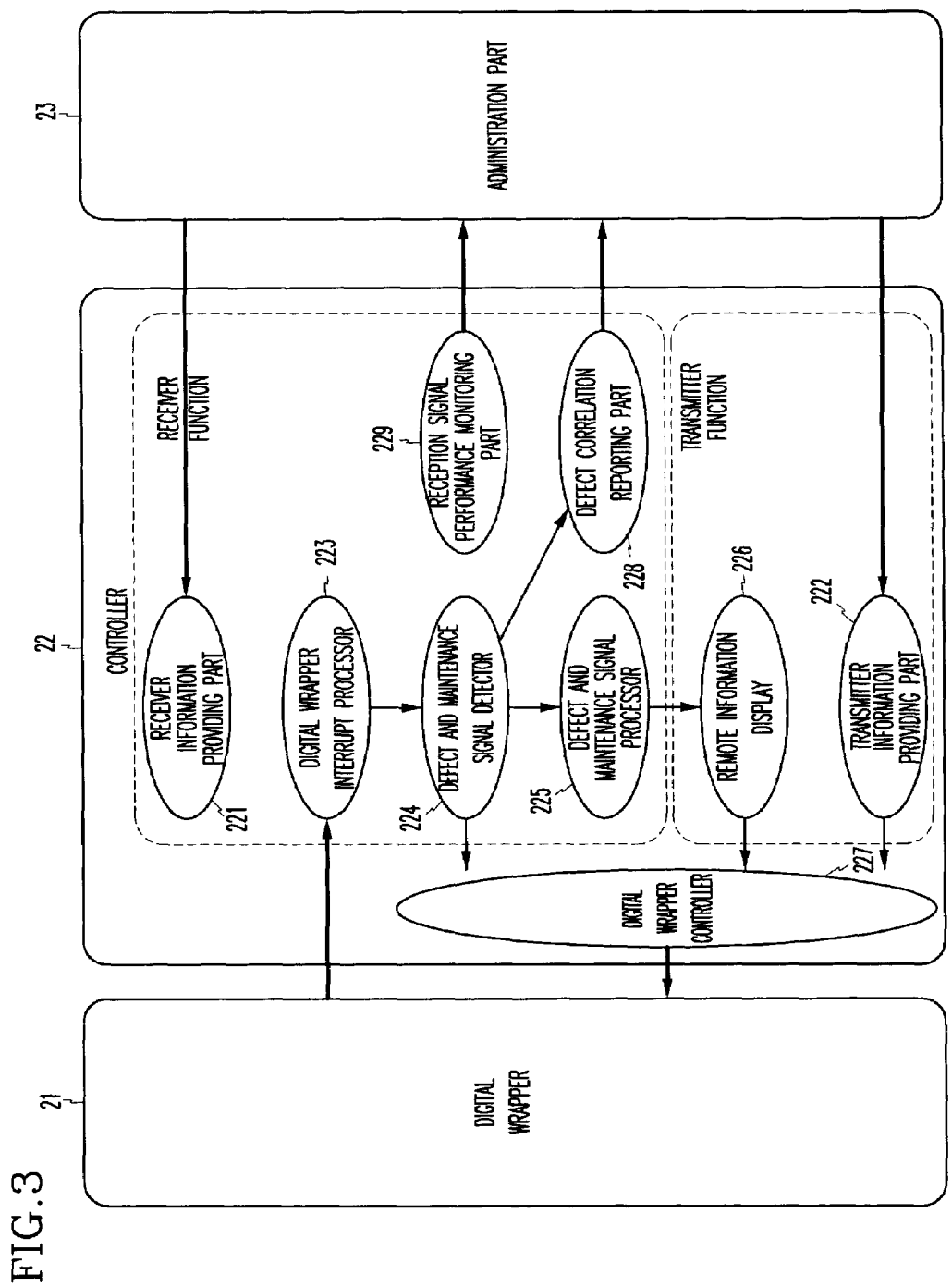
FIG. 3 illustrates a configuration of a system for operating the optical transponder according to an embodiment of the present invention.

FIG. 3 illustrates a configuration of the operator 20 of the optical transponder according to an embodiment of the present invention. The operator 20 of the optical transponder includes a digital wrapper 21 for monitoring the performance of an input signal, a controller 22 for detecting a problem caused by an interrupt generated when the digital wrapper 21 monitors the signal performance and for processing the detected problem, and an administration part 23 for providing an interface with a user to administer the system.

As shown in FIG. 3, the controller 22 that carries out maintenance of a signal and controls a register of the digital wrapper includes a receiver information providing part 221 for providing an expected value of information required to be received through an overhead; a transmitter information providing part 222 for supplying information required to be delivered to a receiving side through the overhead of a transmission signal; a digital wrapper interrupt processor 223 for processing an interrupt signal from the digital wrapper 21; a defect and maintenance signal detector 224 for determining whether or not there is a defect and maintenance signal from the interrupt of the digital wrapper 21; a defect and maintenance signal processor 225 for, when a defect is detected by the defect and maintenance signal detector 224 or is cancelled, processing it; a remote information display 226 for displaying presence/absence of a defect and the quantity of BIP (bit interleaved parity)-8 errors, a digital wrapper controller 227 for updating a value of the register of the digital wrapper under the control of the defect and maintenance signal processor; a defect correlation reporting part 228 for finding the most influential cause of a defect to report it to the administration part 23; and a reception signal performance monitoring part 229 for monitoring a performance value from the interrupt of the digital wrapper 21 to report it to the administration part 23.

Arrows connecting the components of the controller 22 represent sequences of calling corresponding components. For example, only when the digital wrapper interrupt processor 223 is called can the defect and maintenance signal detector 224, defect and maintenance signal processor 225, remote information display 226, and digital wrapper controller 227 be sequentially called.

Figure 4:
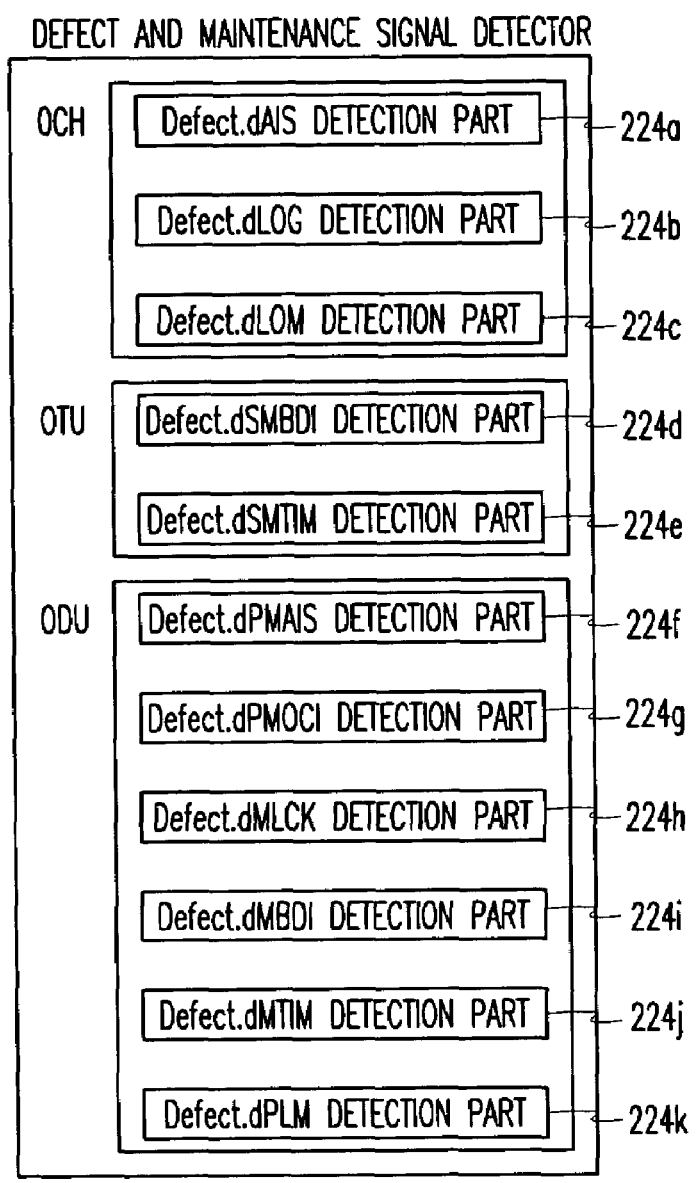
FIG. 4 illustrates a configuration of the defect and maintenance signal detector shown in FIG. 3.
Figure 5:
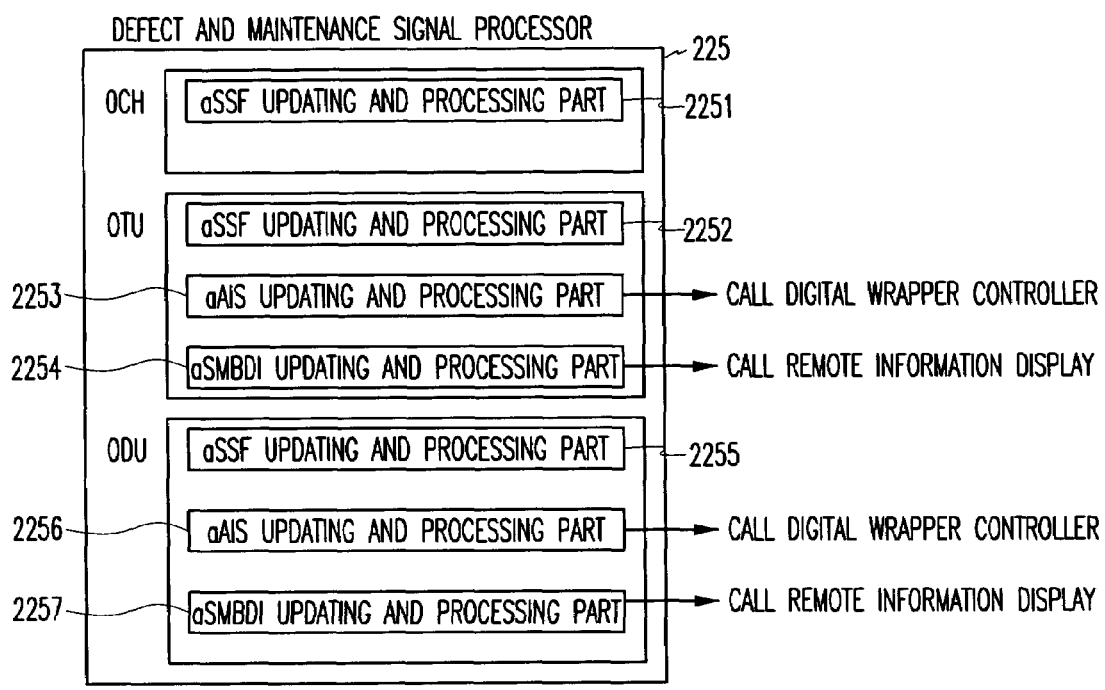
FIG. 5 illustrates a configuration of the defect and maintenance signal processor shown in FIG. 4.

FIG. 4 illustrates a configuration of the defect and maintenance signal detector 224 of the controller 22, and FIG. 5 illustrates a configuration of the defect and maintenance signal processor 225 of the controller 22.

Referring to FIG. 4, the defect and maintenance signal detector 224 according to an embodiment of the present invention includes a Defect.dAIS detection part 224a, a Defect.dLOG detection part 224b, and a Defect.dLOM detection part 224c, which detect errors in signals of an OCH (optical channel) layer; and a Defect.dSMBDI detection part 224d and a Defect.dSMTIM detection part 224e which detect errors in signals of an OUT layer. In addition, the defect and maintenance signal detector 224 further includes a Defect.dPMAIS detection part 224f, a Defect.dP- MOCI detection part 224g, a Defect.dMLCK detection part 224h, a Defect.dMBDI detection part 224i, a Defect.dMTIM detection part 224j, and a Defect.dPLM detection part 224k, which detect errors in a signal of an ODU layer.

The defect and maintenance signal processor 225 according to an embodiment of the present invention processes defect and maintenance signals detected by the defect and maintenance signal detector 224. As shown in FIG. 5, specifically, the defect and maintenance signal processor 225 includes an aSSF updating and processing part 2251 for processing signals of the OCH layer, an aSSF updating and processing part 2252, an aAIS updating and processing part 2253, and an aSMBDI updating and processing part 2254 for processing signals of the OUT layer. In addition, it further includes an aSSF updating and processing part 2255, an aAIS updating and processing part 2256, and an aSMBDI updating and processing part 2257 for processing signals of the OCU layer.

Figure 6:
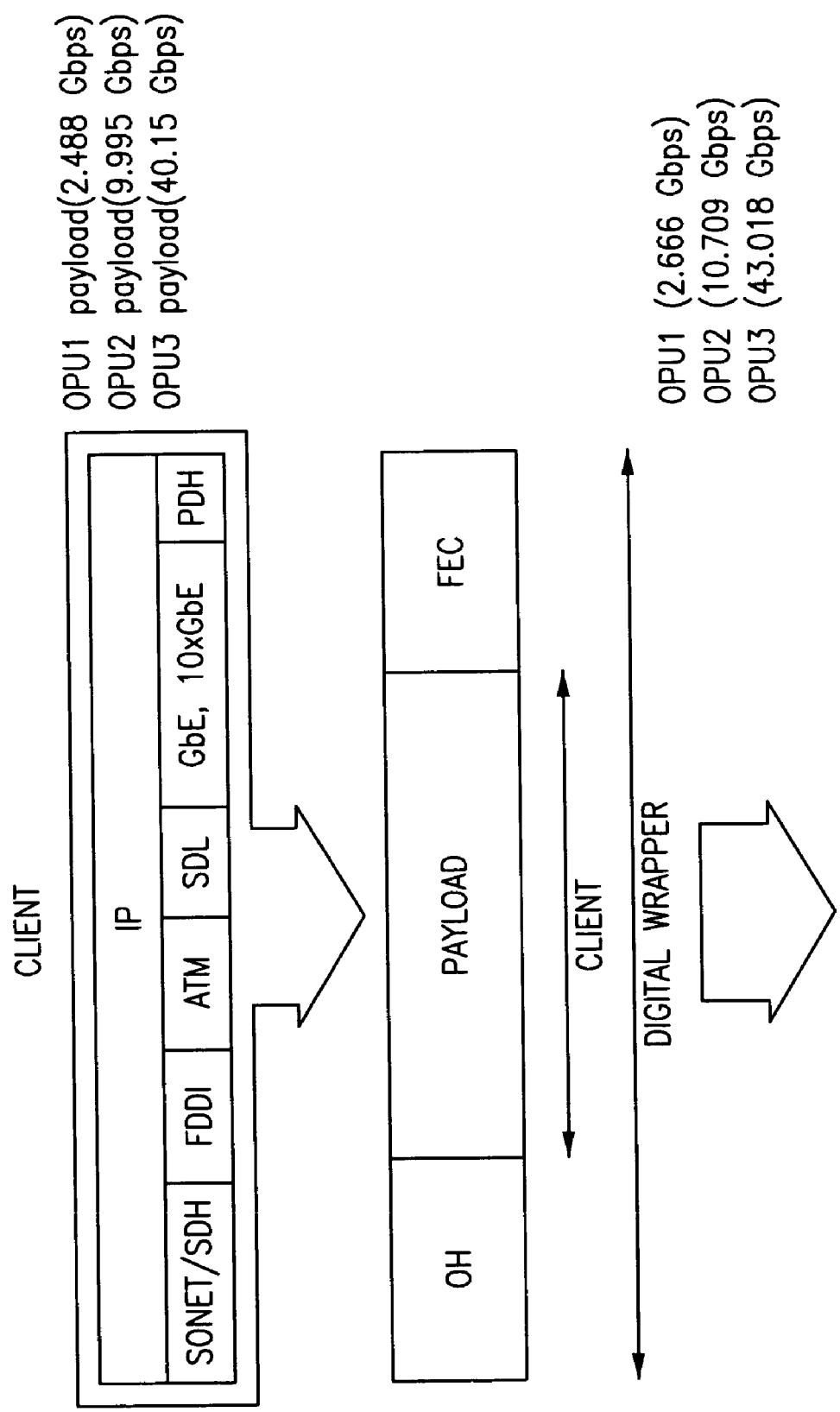
FIG. 6 illustrates a frame structure of a signal generated by a digital wrapper according to an embodiment of the present invention.

In the optical transponder according to the present invention, constructed as above, the frame of a signal generated by the digital wrapper 21 has the structure shown in FIG. 6. FIG. 6 illustrates the frame structure of the signal generated by the digital wrapper, and FIG. 7 illustrates the detailed structure of the overhead of the frame structure shown in FIG. 6.

As shown in FIG. 6, the frame of the signal generated by the digital wrapper has a structure that maps a client signal to a payload, and includes an error correction code and an overhead. In this case, the client signal transfer rate includes 2.488 Gbps, 9.995 Gbps, and 40.15 Gbps, and the transfer rate of the digital wrapper includes 2.666 Gbps, 10.709 Gbps, and 43.018 Gbps, resulting in an increase in the actual transfer rate.

FIG. 7 illustrates the frame structure of a G.709-based digital wrapper, in which one frame is composed of 4080-byte columns and four rows, having the total capacity of 4080×4 bytes. In the frame structure, the client signal is mapped to an OPUk payload and OPUk overhead, and includes the type of client signal mapped to the OPUk payload and justification control information. Information used for maintaining the OPUk payload and OPUk overhead are allocated to the ODUk overhead. Information used for maintaining the OPUk payload, OPUk overhead, and ODUk overhead is assigned to an OTUk overhead. The OTUk overhead includes a forward error correction code (referred to as 'FEC' hereinafter) for correcting an error generated when optical signals are transmitted. The OTUk overhead is inserted/extracted into/from the OTU layer, which is the section of the optical transponder having the digital wrapper, to carry out maintenance and error correction operations.

A frame alignment overhead in the overhead of the digital wrapper used in the embodiment of the present invention is composed of a frame alignment signal (referred to as 'FAS' hereinafter) that indicates the start of a frame, and a multi-frame alignment signal (referred to as 'MFAS' hereinafter) for supporting 256 multi-frames.

The point where the digital wrapper 21 ends is monitored using a section monitoring (SM) overhead among the OTUk overhead, and errors are corrected using the OTU1 forward error correction code. The point of end-to-end path of the digital wrapper 21 is monitored using a path monitoring (PM) overhead among the ODUk overhead. Furthermore, a client signal is determined using a payload structure identifier (PSI) of the OPUk overhead, which indicates the kind of client signal mapped to the OPUk payload.

In FIG. 7, a TTI (trial trace identifier) is a byte that indicates a transmission node and a receiving node of the end section of each layer. Information is inserted into the TTI byte in the transmission node. The TTI byte is extracted to confirm connectivity of a signal in the receiving node.

A BIP-8 byte is used for monitoring the performance of each layer signal. A transmission node of each layer calculates BIP-8 of a signal including OPUk payload and overhead of the current frame, and inserts it to a BIP-8 byte after two frames. A receiving node of each layer calculates a BIP-8 value of the current frame and compares it with the BIP-8 byte value after two frames to detect the quantity of errors generated during each layer section.

BEI (backward error indicator) information is composed of four bits, and it informs the transmission node of the quantity of BIP-8 errors detected by the receiving node of each layer. BDI (backward defect indicator) information is composed of one bit, and it informs the transmission node of a defect detected by the receiving node of each layer.

STAT (status information) is constructed of three bits, and it indicates the state of a signal of each layer. STAT represents a normal signal when it has the value '000', and it indicates a signal locked by an operator when it is '101'. In case of '101', it represents an open connection indication (OCI) signal that is generated because a client signal is not connected. When STAT has the value '111', it indicates an alarm indication signal (AIS).

Next, the operation of the system for operating the optical transponder on the basis of the signals constructed as above is explained.

When the optical transponder receives an optical signal transmitted from a transmission node of a different transport network or the same transport network, the receiver 10 converts the received optical signal into an electric signal, demodulates the electric signal, and delivers it to the operator 20. The digital wrapper 21 of the operator 20 monitors the performance of the received signal and generates an interrupt according to the monitoring result. That is, the digital wrapper 21 ORs interrupts causing a defect of each layer and creates an interrupt according to the OR-operation result to inform the controller 22 thereof. Here, it can be constructed in a manner such that the controller 22 is interrupted using an interrupt pin of the digital wrapper 21. Otherwise, the controller 22 can pool the digital wrapper 21 to determine whether or not an interrupt is generated. While these two methods are accepted in the embodiments of present invention, the present invention is not limited to them.

The interrupt from the digital wrapper 21 is a signal that indicates a specific state of a received signal to determine a defect of the received signal. The determination on the interrupt is carried out by the controller 22. When the controller 22 receives the interrupt from the digital wrapper 21, it calls the digital wrapper interrupt processor 223 to sequentially detect what the current interrupt is.

Figure 8:
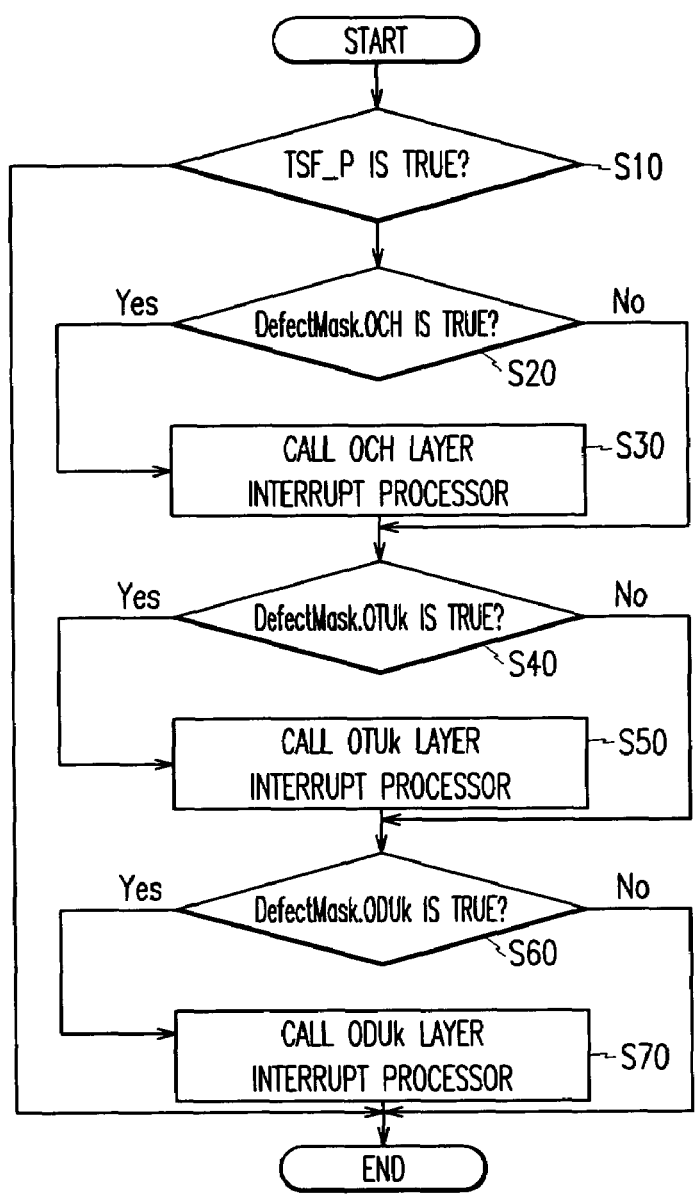
FIG. 8 is a flow chart showing a sequence of processing an interrupt in the digital wrapper of the optical transponder according to an embodiment of the present invention.

FIG. 8 is a flow chart that sequentially shows the operation of the digital wrapper interrupt processor according to an embodiment of the present invention.

At step S10, the digital wrapper interrupt processor 223 determines the value of TSF_P (trail signal fail of payload) that indicates that an OCH optical signal was lost, provided by the digital wrapper 21. When TSF_P is true, the digital wrapper interrupt processor 223 does not detect any interrupt because there is no OCH signal. In the case that TSF_P is false, however, the digital wrapper interrupt processor 223 calls a corresponding detection part of the defect and maintenance signal detector and a corresponding detection part of the defect and maintenance signal processor, to sequentially perform processing of the OCH layer interrupt (S20 and S30), processing of the OTUk layer interrupt (S40 and S50), and processing of the ODUk layer interrupt (S60 and S70).

The processing of interrupt of each layer is carried out, having interrupt masks DefectMask.OCH, DefectMask.OTUk, and DefectMask.ODUk respectively set for the layers, only when the interrupt mask of each layer is true. When the interrupt mask of each layer is false, interrupt processing is not executed even if the digital wrapper 21 currently generates an interrupt and the current interrupt is ignored. Accordingly, in the case that it is not required to determine whether or not there is a specific defect or all defects in a specific layer, the determination on presence/absence of the defect can be effectively carried out or not by making only the interrupt masks true or false. For example, where the administration part 23 does not want to detect all defects of the ODUk layer, the administration part 23 records DefectMask.ODUk as false. In this case, the defect interrupt of the ODUk layer is ignored and detection of a defect is not performed. In the case that a specific defect is cancelled so that DefectMask is changed, DefectMask recorded by the administration part 23 should be restored. In the following embodiment, DefectMasks of all layers are recorded as true. Thus, DefectMask restoration values obtained according to cancellation of defect are all true.

Figure 9:
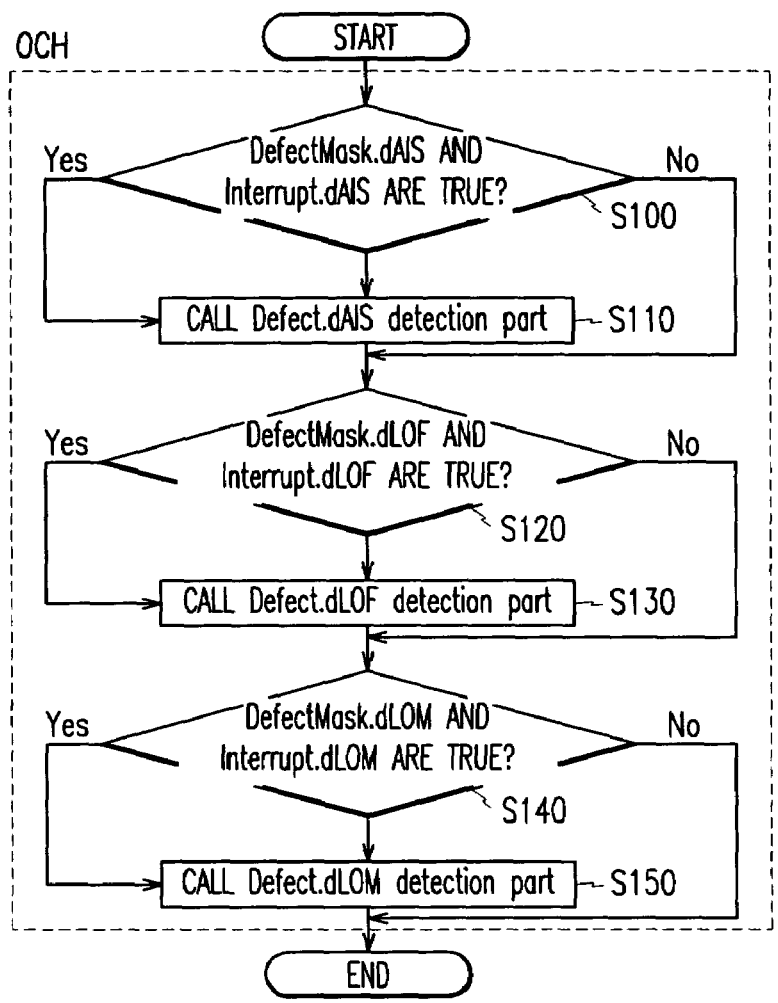
FIG. 9 is a flow chart showing a sequence of processing an interrupt in an OCH layer according to an embodiment of the present invention.

FIG. 9 is a flow chart that sequentially shows the interrupt processing procedure in the OCH layer according to an embodiment of the present invention. Detection of each interrupt is executed when an interrupt from the digital wrapper 21 and interrupt masks are all "true".

Referring to FIG. 9, the interrupt processing procedure determines if an interrupt Interrupt.dAIS and mask DefectMask.dAIS of the OCH layer are true, and when both of them are true, calls the Defect.dAIS detection part 224a of the defect and maintenance signal detector 224 at steps S100 and S110.

Figure 10:
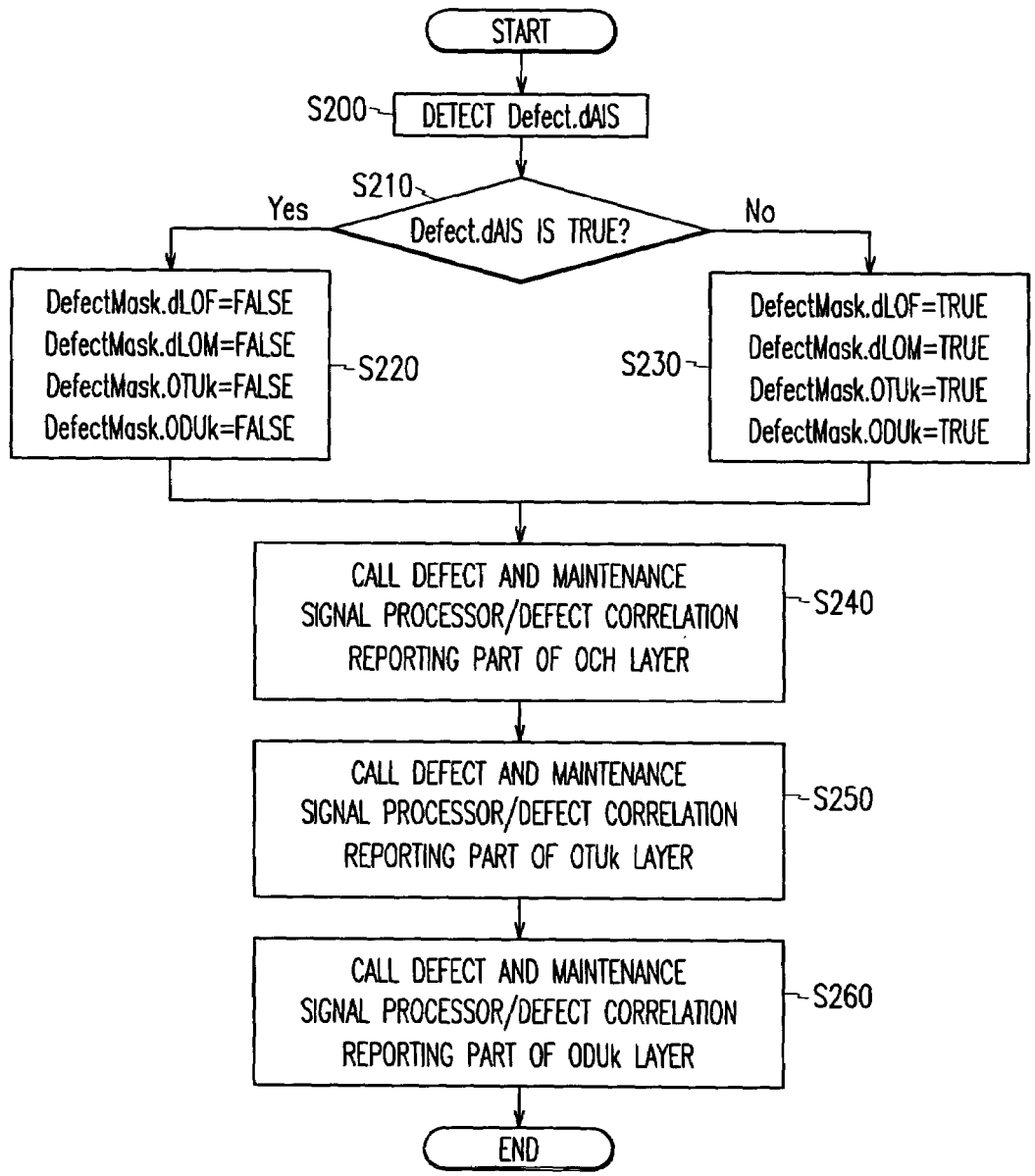
FIG. 10 is a flow chart showing the operation of a Defect.dAIS detector according to an embodiment of the present invention.

FIG. 10 is a flow chart showing the operation of the Defect.dAIS detection part. As shown in FIG. 10, the Defect.dAIS detection part 224a determines whether Defect.dAIS is true or false and executes an operation corresponding to the true or false case at step S200. If Defect.dAIS is true, it is because the currently received signal is the AIS signal. Thus, the Defect.dAIS detection part 224a processes all of DefectMask.dLOF, DefectMask.dLOM, DefectMask.OTUk, and DefectMask.ODUk of the OCH layer to be false at steps S210 and S220.

On the other hand, in the case that Defect.dAIS is false, this is because the currently received signal does not includes the AIS signal so that the Defect.dAIS detection part 224a processes all of DefectMask.dLOF, DefectMask.dLOM, DefectMask.OTUk, and DefectMask.ODUk of the OCH layer to be true at step S230.

In the meantime, when the received signal is the AIS signal, all signals of the frame have an AIS pattern so that the signal indicating the frame alignment signal and multi-frame alignment signal cannot be detected. This will generate various interrupts including Interrupt.dLOF, Interrupt.dLOM, etc. In addition, all interrupts of OTUk and ODUk layers will be generated. In this case, since a plurality of unnecessary interrupts are generated, interrupt processing can be easily ignored using DefectMask.

Subsequently, the Defect.dAIS detection part sequentially calls the defect and maintenance signal processor/defect correlation reporting part of the OCH layer, the defect and maintenance signal processor/defect correlation reporting part of the OTUk layer, and the defect and maintenance signal processor/defect correlation reporting part of the ODUk layer, which are affected by a variation in Defect.dAIS, through steps S240, S250, and S260.

Meanwhile, in the case that Interrupt.dLOF and DefectMask.dLOF of the OCH layer are all true at step S120 of FIG. 9, the Defect.dLOF detection part 224b of the defect and maintenance signal detector 224 is called.

Figure 11:
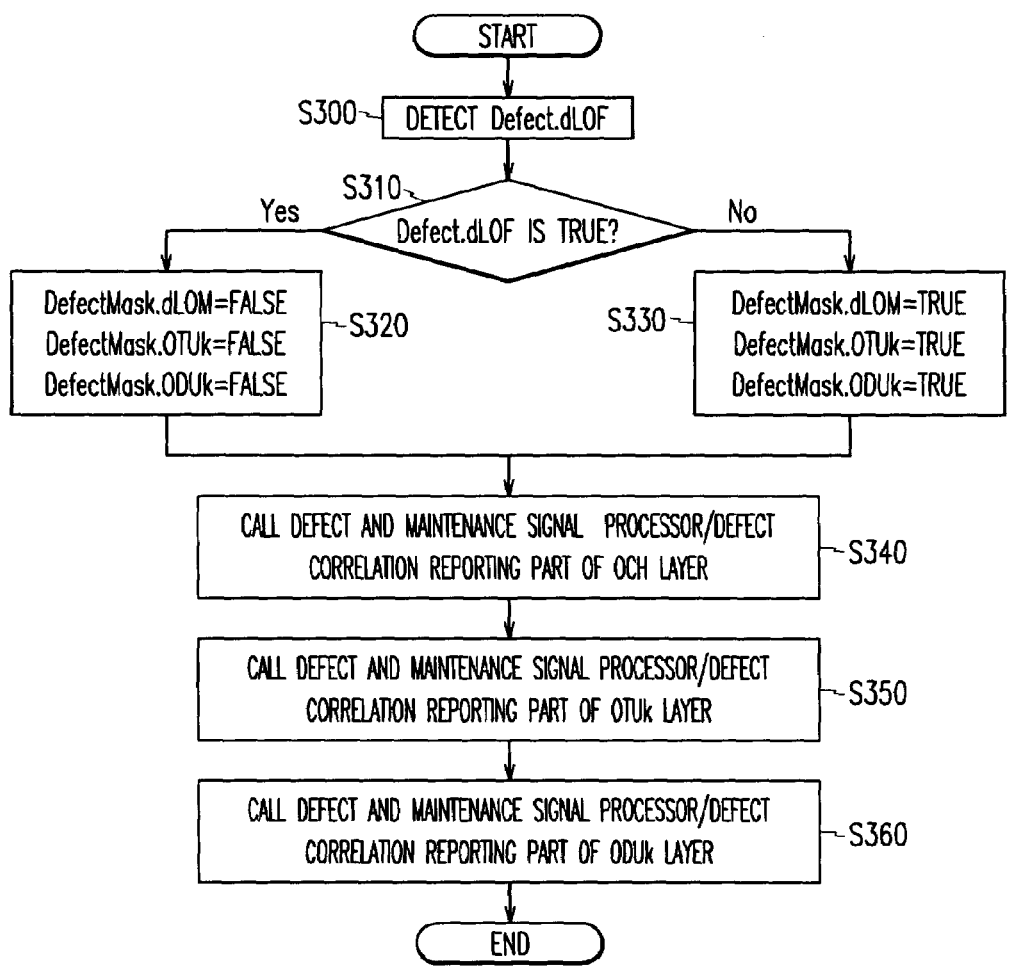
FIG. 11 is a flow chart showing the operation of a Defect.dLOF detector according to an embodiment of the present invention.

FIG. 11 is a flow chart showing the operation of the Defect.dLOF detection part 224b. First of all, the Defect.dLOF detection part 224b determines whether Defect.dLOF is true or false and executes an operation corresponding to the true or false case at step S300. If Defect.dLOF is true, the Defect.dLOF detection part determines whether or not the currently received signal is in an LOF (loss of frame) state, and when it is, processes Defect.dLOF to be true and processes all of DefectMask.dLOM, DefectMask.OTUk, and DefectMask.ODUk of the OCH layer to be false at steps S310 and S320.

When Defect.dLOF is false, the Defect.dLOF detection part determines whether or not the currently received signal is in an LOF (loss of frame) state, and when it is not, processes Defect.dLOF to be false and processes all of DefectMask.dLOM, DefectMask.OTUk, and DefectMask.ODUk of the OCH layer to be true at step S330.

In the case that the received signal is in the LOF state, which means that the start of the frame cannot be found so that the frame is not properly recovered, the multi-frame alignment signal cannot be detected. Thus, all interrupts of OTUk and ODUk layers as well as Interrupt.dLOM will be generated. This causes creation of a plurality of unnecessary interrupts to be generated so that interrupt processing can be easily ignored using DefectMask.

Subsequently, the Defect.dLOF detection part 224b sequentially calls the defect and maintenance signal processor/defect correlation reporting part of the OCH layer, the defect and maintenance signal processor/defect correlation reporting part of the OTUk layer, and the defect and maintenance signal processor/defect correlation reporting part of the ODUk layer, which are affected by a variation in Defect.dLOF, through steps S340, S350, and S360.

Meanwhile, in the case that Interrupt.dLOM and DefectMask.dLOM of the OCH layer are all true at step S140 of FIG. 9, the Defect.dLOM detection part 224c of the defect and maintenance signal detector 224 is called.

Figure 12:
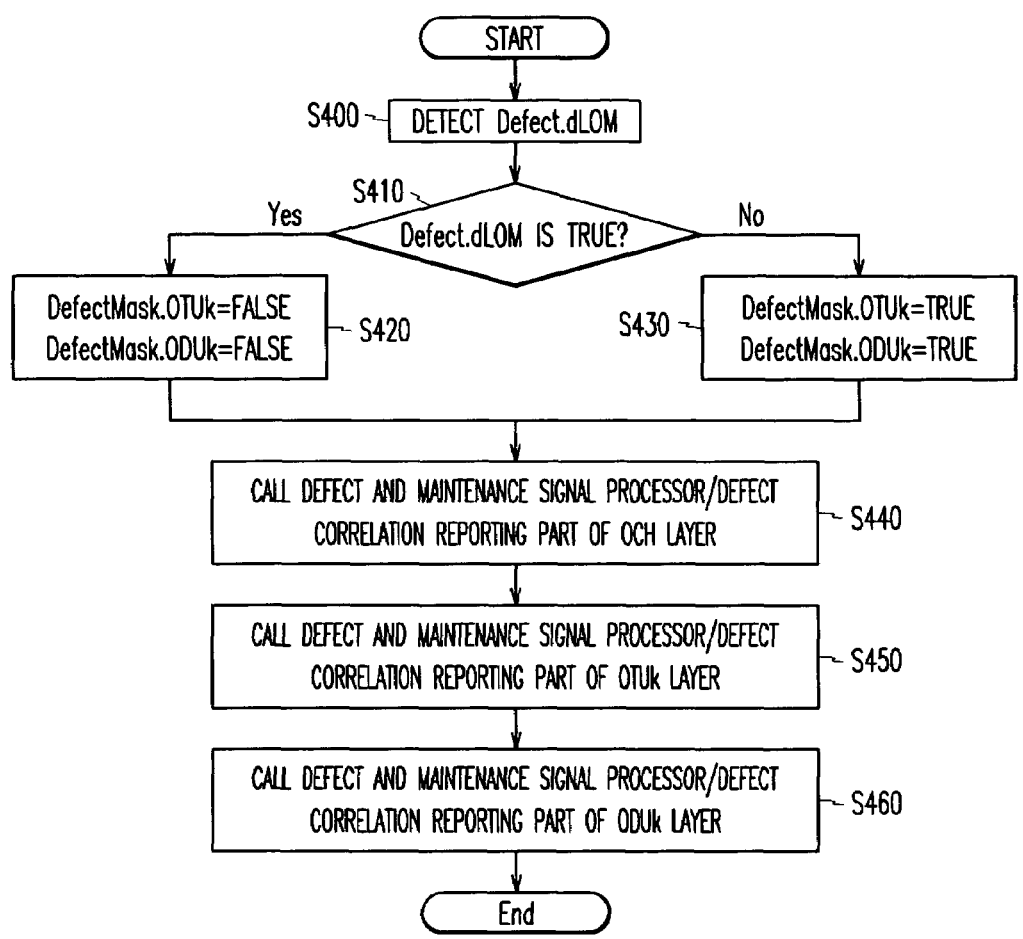
FIG. 12 is a flow chart showing the operation of a Defect.dLOM detector according to an embodiment of the present invention.

FIG. 12 is a flow chart showing the operation of the Defect.dLOM detection part 224c. When the Defect.dLOM detection part 224c is called, it determines if Defect.dLOM is true or false and carries out an operation corresponding to the true or false case at step S400. If Defect.dLOM is true, the Defect.dLOM detection part 224c determines whether or not the currently received signal is in an LOM (loss of multi-frame) state, and when it is, processes Defect.dLOM to be true and processes both of DefectMask.OTUk and DefectMask.ODUk to be false at steps S410 and S420. When Defect.dLOM is false, the Defect.dLOM detection part 224c determines if the currently received signal is not in the LOM state and, when it is not, processes Defect.dLOM to be false and processes both of DefectMask.OTUk and DefectMask.ODUk to be true.

In the case that the received signal is in the LOM state, which means that the multi-frame alignment signal cannot be properly detected, multiple interrupts of OTUk and ODUk layers will be generated. This causes creation of a plurality of unnecessary interrupts so that interrupt processing can be simply ignored using DefectMask.

Then, the Defect.dLOM detection part 224c sequentially calls the defect and maintenance signal processor/defect correlation reporting part of the OCH layer, the defect and maintenance signal processor/defect correlation reporting part of the OTUk layer, and the defect and maintenance signal processor/defect correlation reporting part of the ODUk layer, which are affected by a variation in Defect.d-LOM, through steps S440, S450, and S460.

The OCH layer executes the important function of recovering the frame of the received signal. If the frame of the received signal cannot be recovered, it is impossible to monitor each layer. Because the defect and performance of each layer should be monitored using the overhead of the frame properly recovered, determination of defects of OTUk and ODUk layers that are upper layers becomes meaningless when a defect is generated in the event of recovering the frame in the OCH layer. Thus, the interrupt masks Defect-Mask.OTUk and DefectMask.ODUk are used.

Upon accomplishment of detection of defects of the layers, as described above, the defects are processed as follows.

The defect and maintenance signal processor 225 according to an embodiment of the present invention updates aSSF (server signal fail) information, aAIS (alarm indication signal) information, and aBDI (defect detect indication) information, as defined in ITU-T G.709, using the detected defect information.

First of all, when the aSSF updating and processing part 2251 of the OCH layer detects that aSSF is true, all defects of upper layers (OTUk and ODUk) are processed to be false. The aSSF updating and processing part 2252 of the OTUk layer processes all defects of the upper layer, that is, the ODUk layer, to be false when aSSF is true. The aAIS updating and processing part 2253 of the OTUk layer calls the digital wrapper controller 227 to replace an ODUk signal with an ODUk-AIS signal when aAIS is true, and calls the digital wrapper controller 227 to replace the ODUk signal that has been replaced by the ODUk-AIS signal with a normal signal when aAIS is false. The aSMBDI updating and processing part 2254 of the OTUk layer calls the remote information display 226 and controls it to inform the transmission node of presence/absence of a defect in the received signal.

Figure 13:
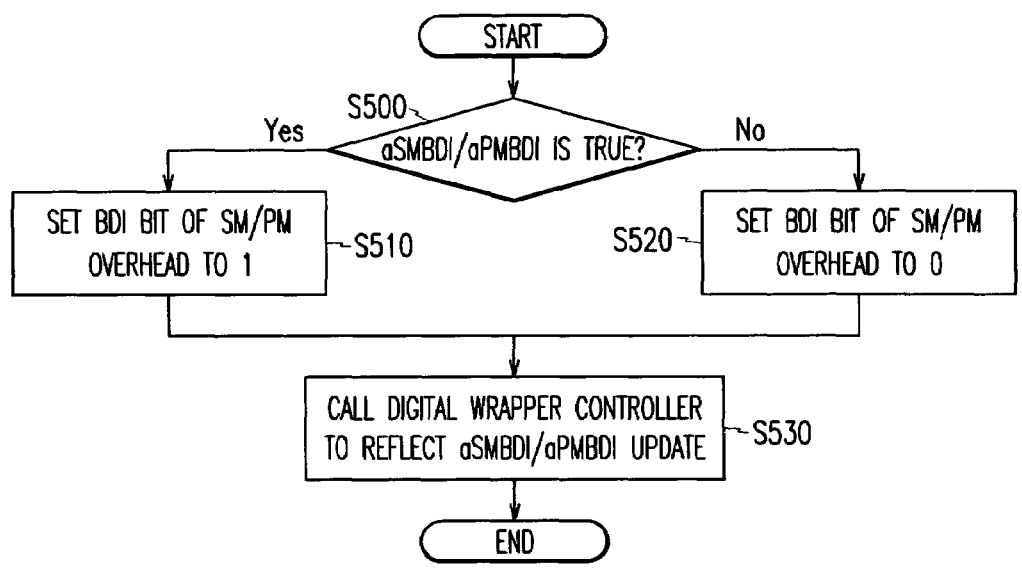
FIG. 13 is a flow chart showing the operation of the remote information display of the OTUk/ODUk layer according to an embodiment of the present invention.

FIG. 13 is a flow chart showing the operation of the remote information display 226 of the OTUk/ODUk layer. As shown in FIG. 13, the remote information display 226 determines whether or not aSMBDI/aPMBDI is true, and sets a BDI bit of the SM/PM overhead of the received signal to "1" when aSMBID/aPMBDI is true at steps S500 and S510. When it is false, the remote information display 226 sets the BDI bit of the SM/PM overhead of the received signal to "0". Subsequently, the remote information display calls the digital wrapper controller 227 to report aSMBDI/aPMBDI update information to it at step 530.

In the meantime, the aAIS updating and processing part 2255 of the ODUk layer in the defect and maintenance signal processor 225 calls the digital wrapper controller 227 to replace an OPUk signal with a generic-AIS signal when aAIS is true. In the case that aASI is false, the aAIS updating and processing part 2255 of the ODUk layer calls the digital wrapper controller 227 to replace the OPUk signal that was replaced by the generic-AIS signal with a normal signal. In addition, the aPMBDI updating and processing part 2257 of the ODUk layer calls the remote information display 226 and controls it to inform the transmission node of presence/absence of a defect in the received signal. Here, aSMBDI/aPMBDI information is set such that it is transmitted to the transmission node all the time.

The defect correlation reporting part 228 of each layer updates cLOF and cLOM information of the OCH layer, cSMSSF (section monitoring server signal fail), cSMBDI (section monitoring backward defect indication), and cSMTIM (section monitoring trail identifier mismatch) information of the OTUk layer, cPMSSF (path monitoring server signal fail), cPMLCK (path monitoring locked signal), cPMOCI (path monitoring open connection indication), cPMTIM (path monitoring trail identifier mismatch), cPMBDI (path monitoring backward defect indication), and cPLM (payload mismatch) information of the ODUk layer, as defined in ITU-T G.798, using the detected defect information, and reports it to the administration part 23.

In the meantime, the reception signal performance monitoring part 229 monitors the performance of the received signal for a specific period of time (one second in general) to report it to the administration part 23. It is preferable that each information set is composed of performance information defined in ITU-T G.798.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

According to the present invention, in the optical transponder having the digital wrapper, optical channels can be efficiently monitored and administered using the overhead of the digital wrapper irrespective of a transmitted client signal. Furthermore, interrupts from the digital wrapper can be processed to effectively maintain the received signal. Moreover, unnecessary interrupts can be restrained using Defect-Mask, and all functions of the controller, related to defect and maintenance, are called only when an interrupt is generated from the digital wrapper so that the controller can be efficiently operated. In addition, it is possible to monitor the performance as well as presence/absence of a defect in the received signal even if a measurement instrument for monitoring the received signal is not operated at all times. Accordingly, the cost of the operation system can be reduced.

What is claimed is:

1. An optical transmission system including a plurality of layers, the system comprising:
   an optical transponder having a digital wrapper, the optical transponder operates to execute maintenance of a received signal in the optical transponder;
   the optical transponder further including:
     a digital wrapper interrupt processor for processing an interrupt signal generated from the digital wrapper according to monitoring of the received signal;
     a defect and maintenance signal detector for determining whether or not the received signal has a defect and determining whether or not the received signal requires maintenance under the control of the digital wrapper interrupt processor;
     a defect and maintenance signal processor for, when a defect is detected by the defect and maintenance signal detector or is cancelled, processing the defect; and
     a digital wrapper controller for controlling the digital wrapper according to the processing result of the defect and maintenance signal processor,
   wherein the plurality of layers includes an optical transport unit layer, an optical data unit layer and an optical channel layer, and the digital wrapper interrupt processor sets a defect mask for each layer and processes an interrupt of each layer when the defect mask is true, and the defect and maintenance signal detector processes the defect mask of another layer to be false so as to ignore processing of a generated interrupt in the case that a defect of the optical channel layer is detected.

2. The optical transmission system as claimed in claim 1, wherein, when the digital wrapper interrupt processor detects an interrupt with respect to the received signal from the digital wrapper and determines that the received signal has a defect, the digital wrapper interrupt processor calls the defect and maintenance signal detector to allow it to detect the defect.

3. The optical transmission system as claimed in claim 1, wherein a signal that is received and transmitted by the optical transponder has a structure that maps a client signal to a payload and includes an error correction code and an overhead.

4. The optical transmission system as claimed in claim 3, further comprising:
   a transmitter information providing part for providing information required to be delivered to a receiving side through the overhead of the transmitted signal; and
   a receiver information providing part for providing an expected value of information required to be received through the overhead.

5. The optical transmission system as claimed in claim 1, further comprising:
   a remote information display for displaying presence/absence of a defect and the quantity of BIP-errors according to the result of the defect and maintenance signal processor;
   a defect correlation reporting part for finding the cause of the defect to report it; and
   a performance monitoring part for monitoring a performance value of the received signal to report it.

6. A method comprising:
   operating an optical transponder, the optical transponder operates to perform maintenance of a received signal in an optical transmission system including multiple layers, the optical transponder having a digital wrapper, the optical transponder further operates by:
   calling a processor for processing an interrupt when the interrupt is generated from the digital wrapper according to monitoring of the received signal;
   the called processor detecting what defect is generated in the received signal and detecting whether or not the received signal requires maintenance;
   performing defect processing in the case that a defect is detected by the called processor or is cancelled; and
   controlling the digital wrapper according to the defect and maintenance processing result,
   wherein the plurality of layers includes at least one among an optical transport unit layer, an optical data unit layer, and an optical channel layer, and defect and maintenance functions of the digital wrapper controller only operate when an interrupt signal is generated by the digital wrapper, and the calling the processor comprises: setting a defect mask for each layer and processing an interrupt of each layer when the defect mask is true, and the called processor detecting comprises processing the defect mask of another layer to be false so as to ignore processing of a generated interrupt in the case that a defect of the optical channel layer is detected.

7. The method as claimed in claim 6, wherein, in the case that a defect of an OCH channel is detectedlcancelled, comprises: processing the defect mask of another layer to be false so as to ignore processing of a generated interrupt.

8. The method as claimed in claim 6, further comprising:
   displaying presence/absence of a defect and the quantity of BIP-errors;
   finding the cause of the defect to report it; and
   monitoring a performance value of the received signal to report it.

* * * * *